United States Patent
Zannier (10) Patent No.: US 8,905,444 B2
(45) Date of Patent: Dec. 9, 2014

(54) POLYMERIC CRASH BOX FOR A VEHICLE AND BUMPER STRUCTURE

(75) Inventor: Stefania Zannier, Correzzana (IT)

(73) Assignee: Tres Srl, Turin (TO) (IT)

( * ) Notice: Subject to any disclaimer, the term of this patent is extended or adjusted under 35 U.S.C. 154(b) by 3 days.

(21) Appl. No.: 13/876,221

(22) PCT Filed: Apr. 4, 2011

(86) PCT No.: PCT/IB2011/051430
§ 371 (c)(1),
(2), (4) Date: Mar. 27, 2013

(87) PCT Pub. No.: WO2012/042396
PCT Pub. Date: Apr. 5, 2012

(65) Prior Publication Data
US 2013/0193699 A1    Aug. 1, 2013

(30) Foreign Application Priority Data
Sep. 28, 2010    (IT) .............................. MI2010A1772

(51) Int. Cl.
*B60R 21/00*    (2006.01)
*F16F 7/12*    (2006.01)
*B60R 19/34*    (2006.01)

(52) U.S. Cl.
CPC ............... *B60R 19/34* (2013.01); *F16F 7/121* (2013.01)
USPC ........................................ 293/132; 293/133

(58) Field of Classification Search
USPC ............... 293/132, 133, 102, 120; 296/146.6, 296/187.03, 187.04, 187.09, 187.11, 187.12
See application file for complete search history.

(56) References Cited

U.S. PATENT DOCUMENTS

| | | | |
|---|---|---|---|
| 5,636,866 A * | 6/1997 | Suzuki et al. | ................. 280/748 |
| 5,806,889 A | 9/1998 | Suzuki et al. | |
| 5,934,730 A | 8/1999 | Yagishita | |
| 8,096,604 B2 | 1/2012 | Asenkerschbaumer et al. | |
| 2001/0017476 A1 | 8/2001 | Nishikawa et al. | |

FOREIGN PATENT DOCUMENTS

| | | |
|---|---|---|
| DE | 20 2007 016671 | 2/2008 |
| EP | 1 001 091 | 5/2000 |
| JP | 9 071200 | 3/1997 |
| JP | 2001-239834 | 9/2001 |
| WO | 2011/007844 | 1/2011 |

OTHER PUBLICATIONS

International Search Report dated Jun. 29, 2011, corresponding to PCT/IB2011/051430.

* cited by examiner

*Primary Examiner* — Joseph D Pape
(74) *Attorney, Agent, or Firm* — Young & Thompson

(57) ABSTRACT

A polymeric crash box (10) for a motor vehicle having a first open frontal extremity (12) and a second rear extremity (14), further including a substantially alveolar structure (20) having a plurality of channels (30) realized in just one piece which extends internally to the polymeric crash box (10), each channel (30) further being internally tapered towards the second rear extremity (14). The polymeric crash box (10) includes at least a substantially planar polymeric fixing element (52) which is realized in a single piece in proximity of the first frontal open extremity (12) and which further can be fixed to a crossbeam (60). A bumper structure for a vehicle including at least two polymeric crash boxes (10) and having a substantially Ω-shaped cross-section, and an external polymeric bumper housing covering the crossbeam (60) and the two at least polymeric crash boxes (10).

16 Claims, 13 Drawing Sheets

FIG. 15

POLYMERIC CRASH BOX FOR A VEHICLE AND BUMPER STRUCTURE

BACKGROUND OF THE INVENTION

The present invention refers to a polymeric crash box for a vehicle applicable in the automotive field and in particular usable as sacrificial element in a bumper structure of a motor vehicle.

DESCRIPTION OF THE RELATED ART

Typically a crash box is able to absorb a portion of kinetic energy during a crash of a motor vehicle against an obstacle fixed or mobile.

In particular the present invention is referred to a crash box of polymeric type, of the type realized in particular through injection molding and having a substantially alveolar structure, in such a way to have a good impact strength and high rigidity, accompanied with a reduced weight.

Each crash box shows a first frontal extremity which stands for first the crash, and a second rear extremity, which is constrained to a frame of the vehicle.

Each crash box is in fact designed for having in the case of crash a permanent plastic deformation and a programmed collapse starting from a frontal portion towards a second rear portion of the same determining consequently a plurality of folding starting from said frontal portion towards said second rear portion.

In this way each crash box is able to absorb and to progressively dissipate a portion of kinetic energy through plastic deformation and by means of the propagation of said plurality of folding, maintaining a reduced volume and weight.

A disadvantage of the polymeric crash boxes is that, in the case of a crash force angled with respect to the first frontal extremity, it determines a bending moment which compromises the stability and, often determines a sudden failure or a deformation of the rear portion of the crash boxes, compromising their correct working during the same crash.

Another analogous disadvantage is that in the case of a failure of a support element constrained to said second rear extremity, it determines an intensification of the stresses on said second rear extremity compromising the functionality of the crash box.

This because also in this case the plurality of folding starts from said second rear extremity.

SUMMARY OF THE INVENTION

The present invention refers to a bumper structure in particular for a transportation means such as for example a motor vehicle.

The present invention refers to a type of bumper structure, having at least two polymeric crash boxes.

The known bumper structures having at least two polymeric crash boxes also comprise a crossbeam extending between the same, and also comprise an outer polymeric bumper housing having only an aesthetic function, which covers said polymeric crossbeam and said at least two polymeric crash boxes.

The polymeric crash boxes have in particular a substantially alveolar structure which permits to absorb a portion of kinetic energy due to an impact of the motor vehicle against an obstacle fixed or mobile.

Each polymeric crash box is positioned between said polymeric crossbeam and a frame of said motor vehicle, in order to absorb during said impact a part of kinetic energy, by consequently reducing the kinetic energy transmitted to said frame.

A disadvantage of the crossbeams is that being constraint to said frame, they transmit to the same the compression stresses associated with the impact itself, and also the connection means from the crossbeam to the frame increase the total weight of the bumper structure.

Furthermore in particular in case of a frontal impact with a pedestrian, the cross beam being very rigid determines a serious damage to the pedestrian, often by determining permanent damages to the knees of the same.

Another disadvantage is that in case of a failure of the polymeric crossbeam, a correct stress of the crash boxes is compromised, and consequently also their correct function.

Purpose of the present invention is that to realize a polymeric crash box for a vehicle, permitting to globally reduce the weight of the bumper structure and at the same time to reduce at the minimum the impact force transmitted to a frame of the vehicle.

Another purpose is that to realize a polymeric crash box for a vehicle that permits to reduce the production costs and obtain a collapsing force substantially constant during an impact, by maintaining at the same time a high stability.

Another purpose is to realize a polymeric crash box for a vehicle permitting a high cost reduction and a simple assembly of the same in a bumper structure.

Still another purpose is that to realize a bumper structure for a vehicle, permitting to reduce the production costs and also to reduce at a minimum the damage to a pedestrian in case of a frontal impact with the same, by maintaining at the same time a high rigidity of the bumper structure during the impact.

Further purpose is that to realize a polymeric crash box and bumper structure for a vehicle that can be easy to realize and that can be economically advantageous.

Further features of the invention are pointed out in the following claims.

BRIEF DESCRIPTION OF THE DRAWING FIGURES

The features and the advantages of a polymeric crash box for a vehicle and a bumper structure according to the present invention will appear more evident from the following exemplary and non limitative description, referred to the attached schematic drawings in which.

DETAILED DESCRIPTION OF THE INVENTION

With reference to the figures, it is shown a crash box 10 for a motor vehicle, realized in a polymeric material in particular having an high elastic module and having a first open frontal extremity 12 and a second rear extremity 14.

Said crash box 10 also comprises a structure 20 substantially alveolar defined by a plurality of channels 30 realized in just one piece of a polymeric material, each of which is preferably provided with a substantially hexagonal section.

Said plurality of channels 30 extends internally to said crash box 10 starting form said first open frontal extremity 12 towards said second rear extremity 14, and furthermore each channel 30 of said plurality of channels 30 being internally tapered towards said second rear extremity 14 and preferably having an internal rake.

According to the present invention said crash box 10 comprises at least one substantially planar polymeric fixing element 52 which is made integral to the same polymeric crash box 10, and in particular it is realized in just a single piece with an outer lateral surface 22 of said alveolar structure 20, in proximity of said first open frontal extremity 12, and which is further fixable to a crossbeam 60.

Preferably said at least one substantially planar polymeric fixing element 52, preferably having a rectangular shape, is in particular substantially orthogonal to a longitudinal direction 97 and it also externally protrudes with respect to said outer lateral surface 22 of said alveolar structure 20, such as to be very rigid and in order to keep in position said crossbeam 60.

Advantageously this permits to reduce the total cost of a bumper structure.

Advantageously this permits to indirectly connect said crossbeam 60 with a frame of said vehicle in order to avoid a direct transmission of the impact force to the frame itself, at the same time guaranteeing the maximum reduction of the impact force itself, by using at the most the absorbing capacities of said crash box 10, before transmitting said force to said frame of said vehicle.

In this way in fact the impact force must always be transmitted through said polymeric crash box 10 which always absorbs the portion of the same force during its deformation, before transmitting the same attenuated force to the frame of said vehicle.

Furthermore, said at least one substantially planar polymeric fixing element 52 is substantially orthogonal with said longitudinal direction 97 of said polymeric crash box 10, it advantageously permits to guide the deformation of said plurality of channels 30 during said impact, 5 by increasing the stability of said polymeric crash box 10.

Preferably said at least one substantially planar fixing element 52 comprises a plurality of polymeric stiffening means 54 each of them being substantially a substantial planar polymeric element with a substantially triangular shape, which is made integral with said external lateral surface 32, in particular with a wall of the channel 30 of said substantially alveolar structure 20 and with said at least one polymeric substantially planar fixing element 52, in order to be substantially parallel to said longitudinal direction 97.

Advantageously in this way it is possible to obtain at least one polymeric fixing element which is extremely rigid and lightweight and at the same time permits not to modify the programmed deformation of said crash box 10, by keeping it balanced and stable.

Preferably said polymeric substantially planar fixing element 52 has a substantially rectangular shape and a thickness comprised between 2 and 6 mm, in order to be very rigid and so not to alter the programmed deformation and the plurality of programmed folding of said alveolar structure 20 during an impact.

In particular each polymeric stiffening means 54 has a thickness comprised between 0.6 mm and 3 mm which is measured in a substantially orthogonal direction to said longitudinal direction 97, and it advantageously stiffens said polymeric crash box 10, without negatively influencing the plurality of folding of said polymeric crash box 10 during said impact.

Preferably said polymeric substantially planar fixing element 52 comprises a plurality of through-holes 53, which are realized on a basis surface of the same and which are preferably placed between two polymeric stiffening means 54, in order to fix said polymeric crash box 10 to said crossbeam 60.

Preferably said at least one polymeric substantially planar fixing element 52 are at least two polymeric substantially planar fixing elements 52 which are fixed near said first open frontal extremity 12 on opposed sides of said outer lateral surface 22 of said alveolar structure 20.

Advantageously this further increases the stiffness and the correct positioning of said crossbeam 60 with respect to the frame of the vehicle, and also permits to guide in a still more stable way the plurality of folding of said plurality of channels 30, from said first open frontal extremity 12 to said second rear extremity 14.

Preferably said substantially alveolar structure 20 comprises a second plurality of channels 40 realized in a single piece with said plurality of channels 30, through injection molding.

Said second plurality of channels 40 extends starting from said second rear extremity 14 towards said first frontal open extremity 12, further each channel 40 of said second plurality of channels 40 being internally tapered towards said first frontal open extremity 12 and preferably has an internal rake.

Preferably each channel 40 only comprises a plurality of second walls 34 each of which is inclined with respect to a longitudinal axis 98 of each channel 40.

Advantageously in this way it is possible to reduce the extraction force of said polymeric crash box 10 from a die at the end of a phase of injection molding, by maintaining at the same time a good stability of said crash box 10 during an impact.

A high extraction force is a great problem for realizing polymeric crash boxes 10, as it does not permit to realize pieces of great size having greater capacity of absorbing impacts.

Advantageously in this way it is possible to realize a polymeric crash box 10 simple to realize and having a reduced production cost, as for it an injection molding machine is needed, which is much smaller and less costly as it does need very powerful extraction means.

As an advantageous alternative, this permits to mold at the same time two polymeric crash boxes 10 in the same die, by maintaining the same extraction force of just one polymeric crash box non having said second plurality of internally tapered channels 40 towards said first frontal extremity 12.

Preferably each channel 40 of said second plurality of channels 40 is only surrounded by channels 30 of said plurality of internally tapered channels 30 towards said rear extremity 14.

Advantageously in this way it is possible to further reduce the extraction force from a die of said polymeric crash box 10 at the end of a phase of injection molding.

Advantageously this permits to realize a polymeric crash box 10 having a much wider cross-section without the need of a high extraction force for extracting the same from a die.

In fact in this way it is possible to maintain high rakes and at the same time it is possible to obtain a more gradual increase of the resistant section in direction of said second rear extremity 14 of said substantially alveolar structure 20.

Advantageously by means of said second plurality of internally tapered channels 40 towards said first frontal extremity 12, it is possible to obtain a plurality of walls 34 having a substantially constant thickness on all the longitudinal length of said polymeric crash box 10.

Preferably each channel 40 of said second plurality of channels 40 is surrounded by at means 3 channels 30 tapered towards said second rear extremity 14.

In particular each channel 40 of said second plurality of channels 40 is surrounded by at least 6 channels 30 internally tapered towards said second rear extremity 14.

Advantageously this permits to have a plurality of walls 34 with constant thickness, so permitting a much more gradual increase of the resistant section towards said second rear extremity 14.

Advantageously this further permits to have an extremely constant collapsing force during an impact, so giving to said polymeric crash box 10 a high stability during said impact, and also permitting at the same time to avoid a rupture or a programmed deformation starting from said rear extremity 14.

Said plurality of channels 30 comprises a plurality of walls 32 each of which is at the same time a wall of another channel 30 of said plurality of channels 30 internally tapered towards said second rear extremity 14.

Furthermore said plurality of channels 30 comprises a plurality of second walls 34 each of which is at the same time a wall of a corresponding channel 40 of said plurality of channels 40.

Being preferably surrounded only from channels 30 internally tapered towards said rear extremity 14, each channel 40 is therefore just formed by a plurality of second walls 34.

Preferably each second wall 34 advantageously has a substantially constant thickness along a longitudinal axis 98, whereas each wall 32 has an increasing thickness towards said second rear extremity 14.

Each channel 40 internally tapered towards said first frontal extremity 12 being surrounded by channels 30 which are internally tapered towards said second rear extremity 14, the total number of second walls 34 is always less than the total number of walls 32.

Advantageously in this way so it is possible to have a resistant section which increases in a much more gradual way towards said second rear extremity 14, so obtaining a much more constant collapsing force of said polymeric crash box 10 during an impact.

Preferably each second wall 34 is substantially inclined with respect to a longitudinal axis 98 of a corresponding channel 40 of an angle whose absolute value is comprised between 0° and 5° and in particular between 0.5° and 2°.

Furthermore this advantageously permits to increase the length of the plurality of channels 30 and 40 without increasing in an excessive way the extraction force.

Preferably each second wall 34 has a substantially constant thickness along said axis 98 of a corresponding channel 40 and it is also substantially inclined with respect to said longitudinal axis 98 of an angle whose absolute value is comprised between 0° and 5° and in particular between 0.5° and 2°.

Advantageously this permits to obtain a reduction of the extraction force of said polymeric crash box 10 from a mould, and also permits to simplify the realization of the same and of the mould.

Preferably each wall 32 with respect to a longitudinal axis 98 of a corresponding channel 30 has a rake whose absolute value is comprised between 0° and 0.2° and in particular comprised between 0° and 0.1°.

This permits to have a gradual increase of the collapsing force of said polymeric crash box 10 as the resistant section from said first front extremity 12 increases by going towards said second rear extremity 14.

Figure 1:
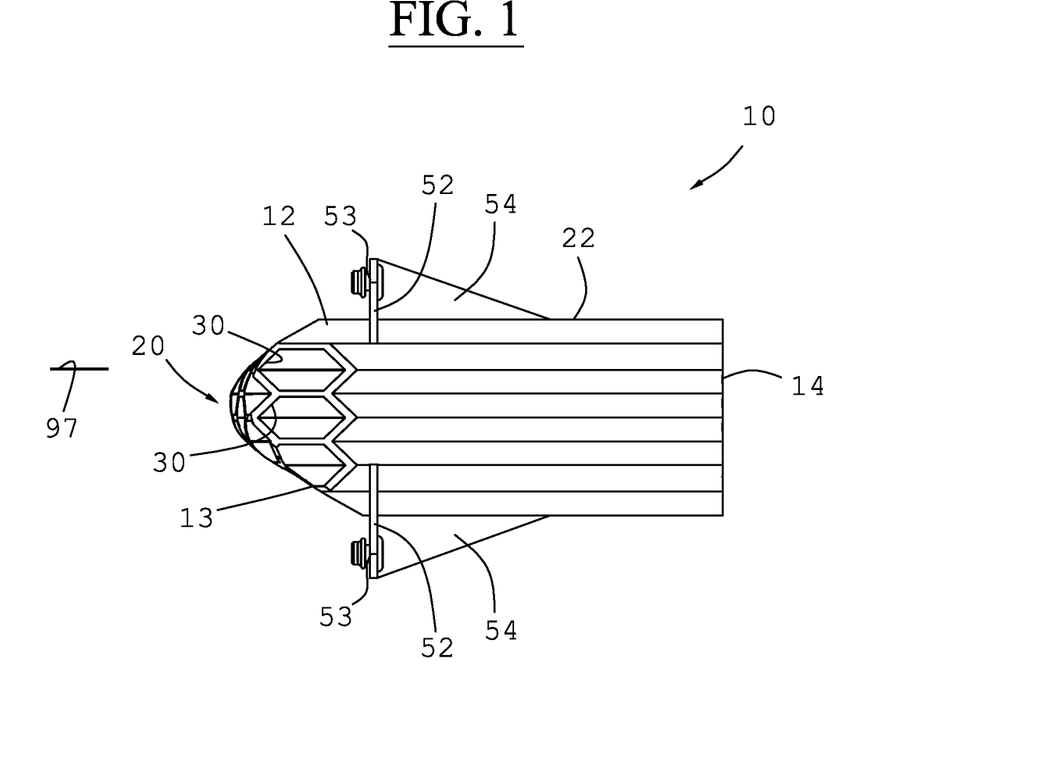
FIG. 1 is a raised lateral right side view of a preferred form of embodiment of a polymeric crash box according to the present invention.
Figure 2:
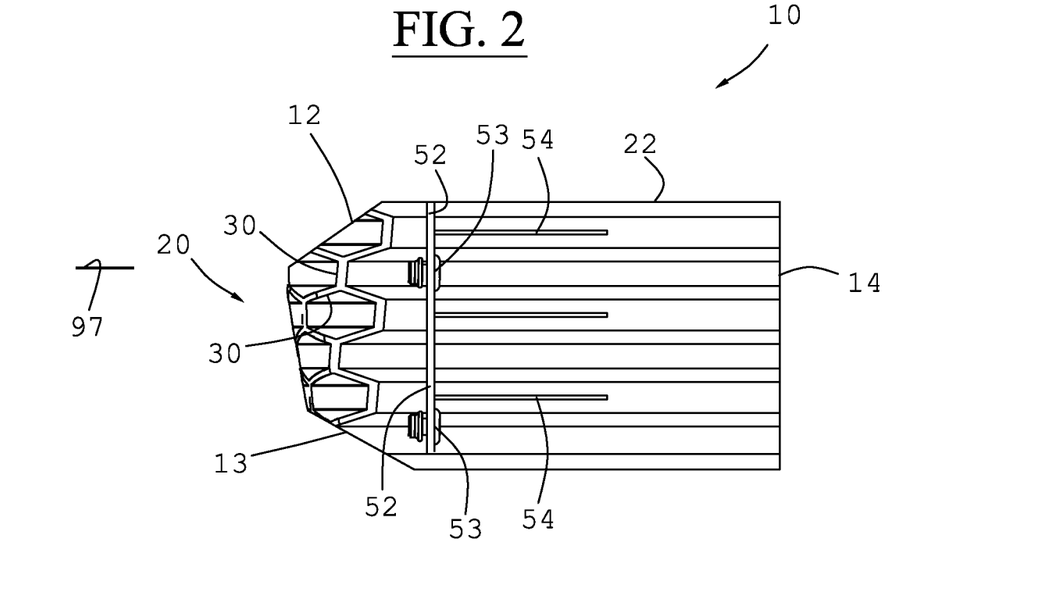
FIG. 2 is a top view of the polymeric crash box of FIG. 1.
Figure 3:
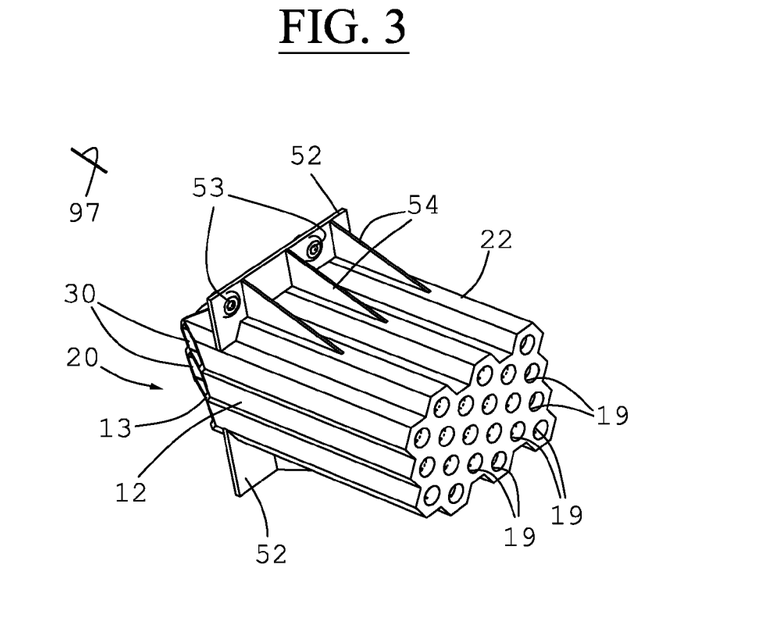
FIG. 3 is a raised lateral right top perspective view of the polymeric crash box of FIG. 1.
Figure 4:
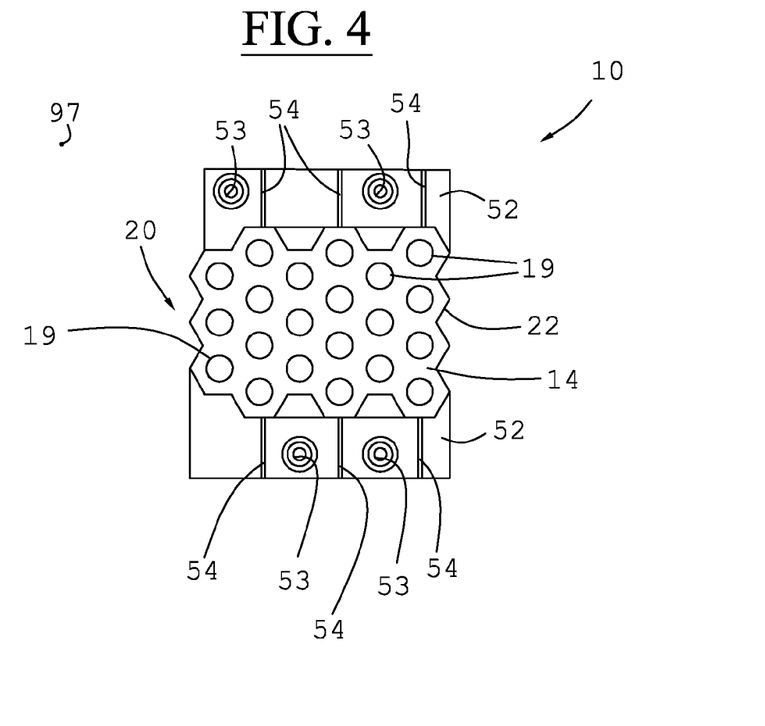
FIG. 4 is a raised front rear view of the polymeric crash box of FIG. 1.
Figure 5:
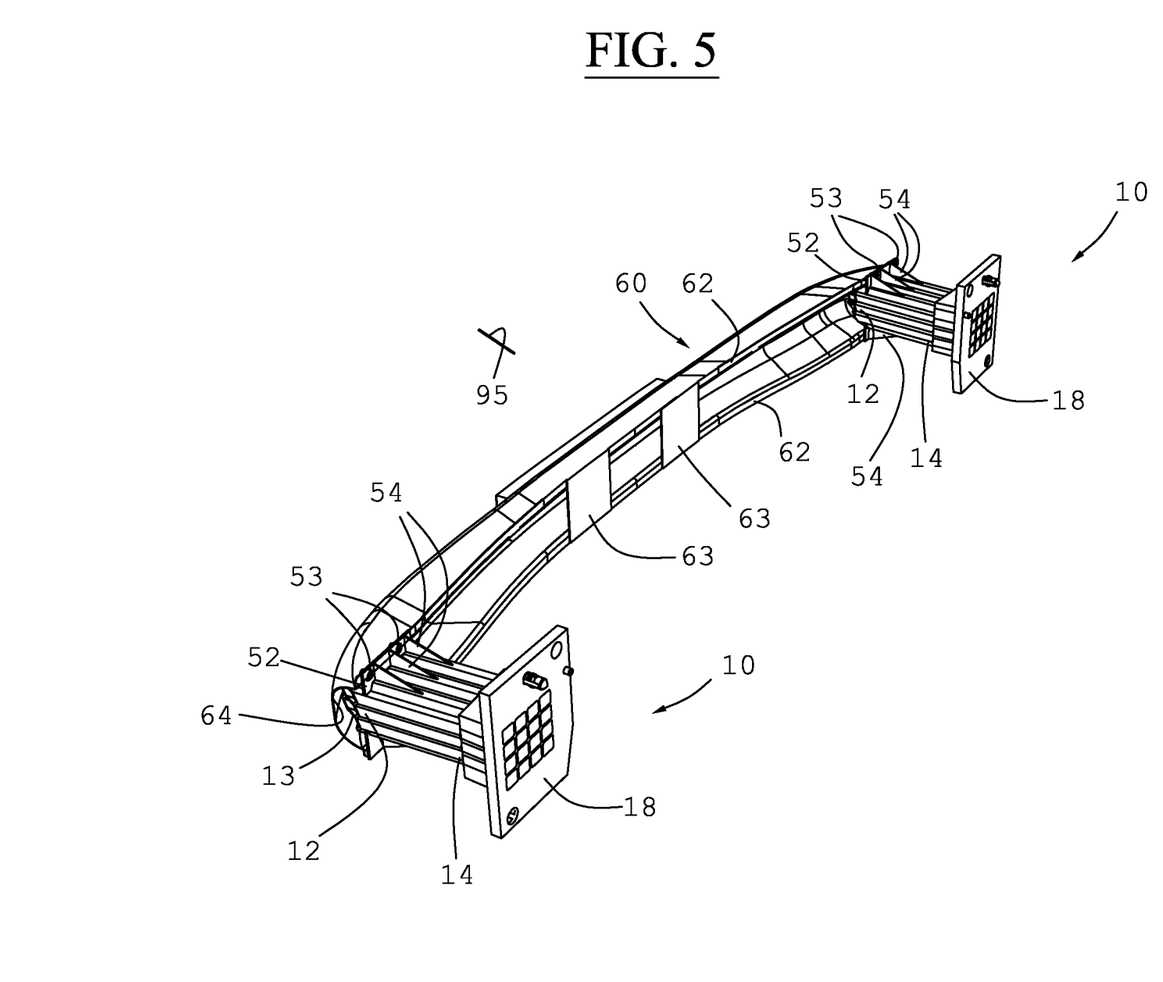
FIG. 5 is a raised lateral right top perspective view of a preferred embodiment of a bumper structure according to the present invention.
Figure 6:
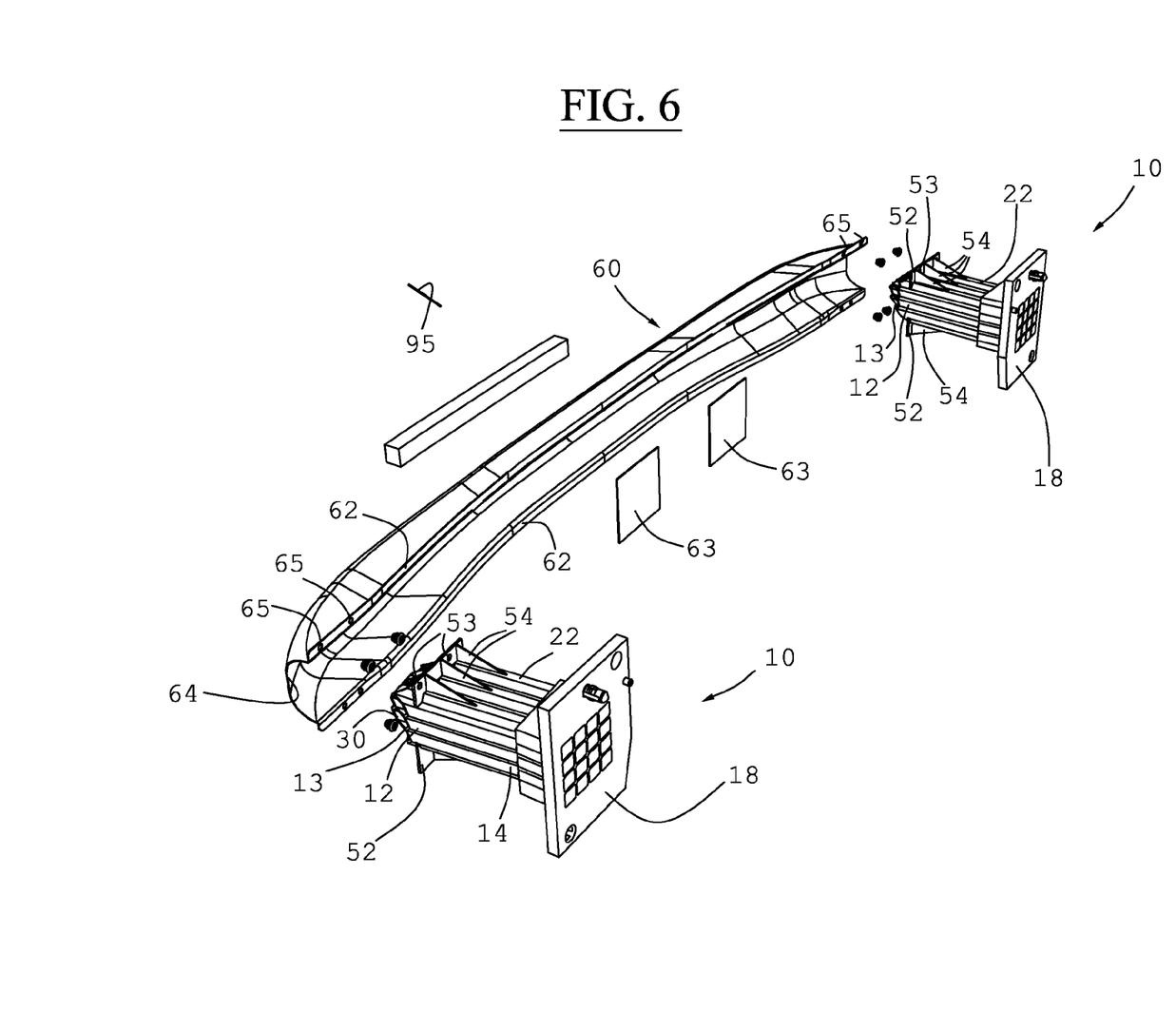
FIG. 6 is a raised lateral right top perspective exploded top view of the bumper structure of FIG. 5.
Figure 7:
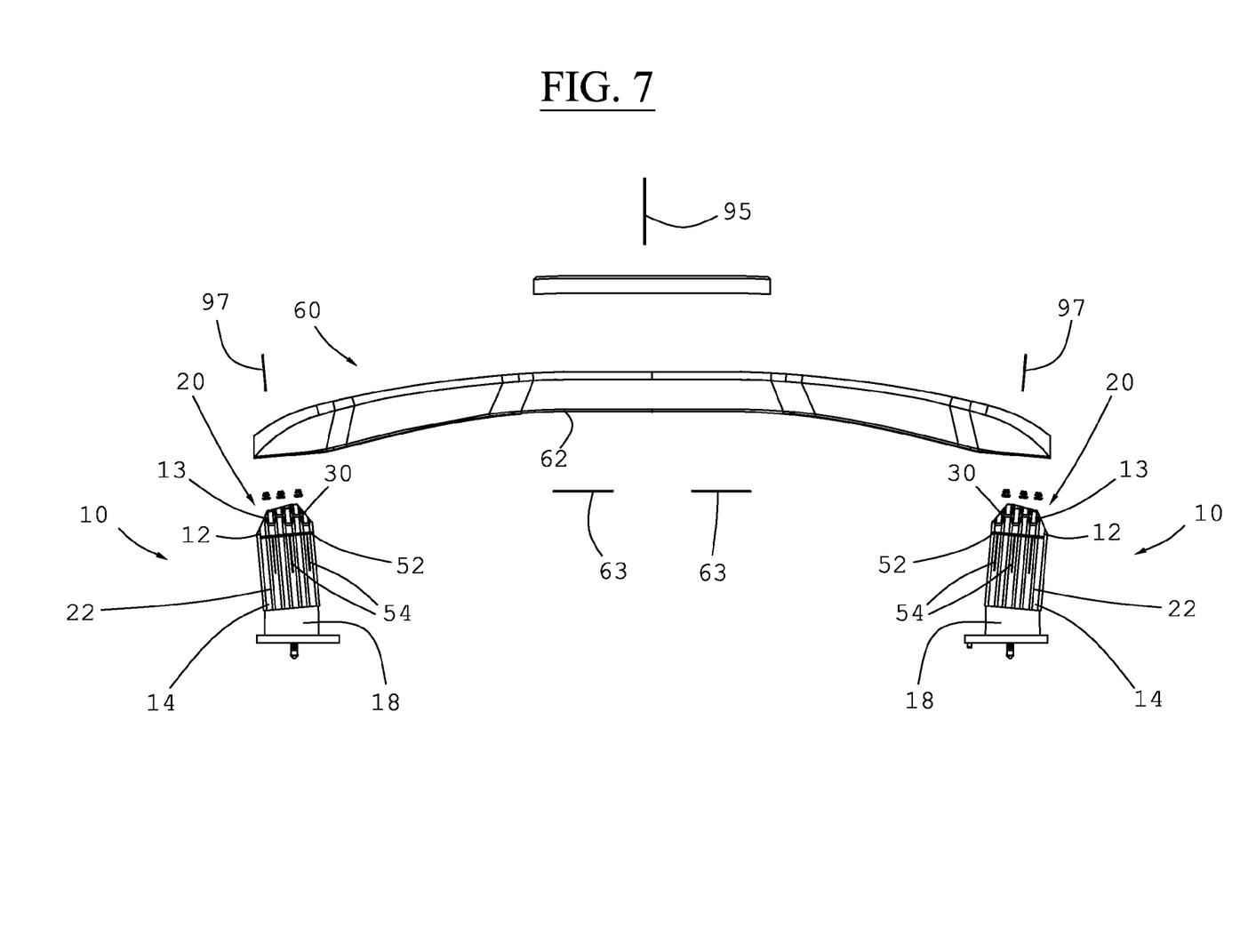
FIG. 7 is a top exploded view of the bumper structure of FIG. 6.
Figure 8:
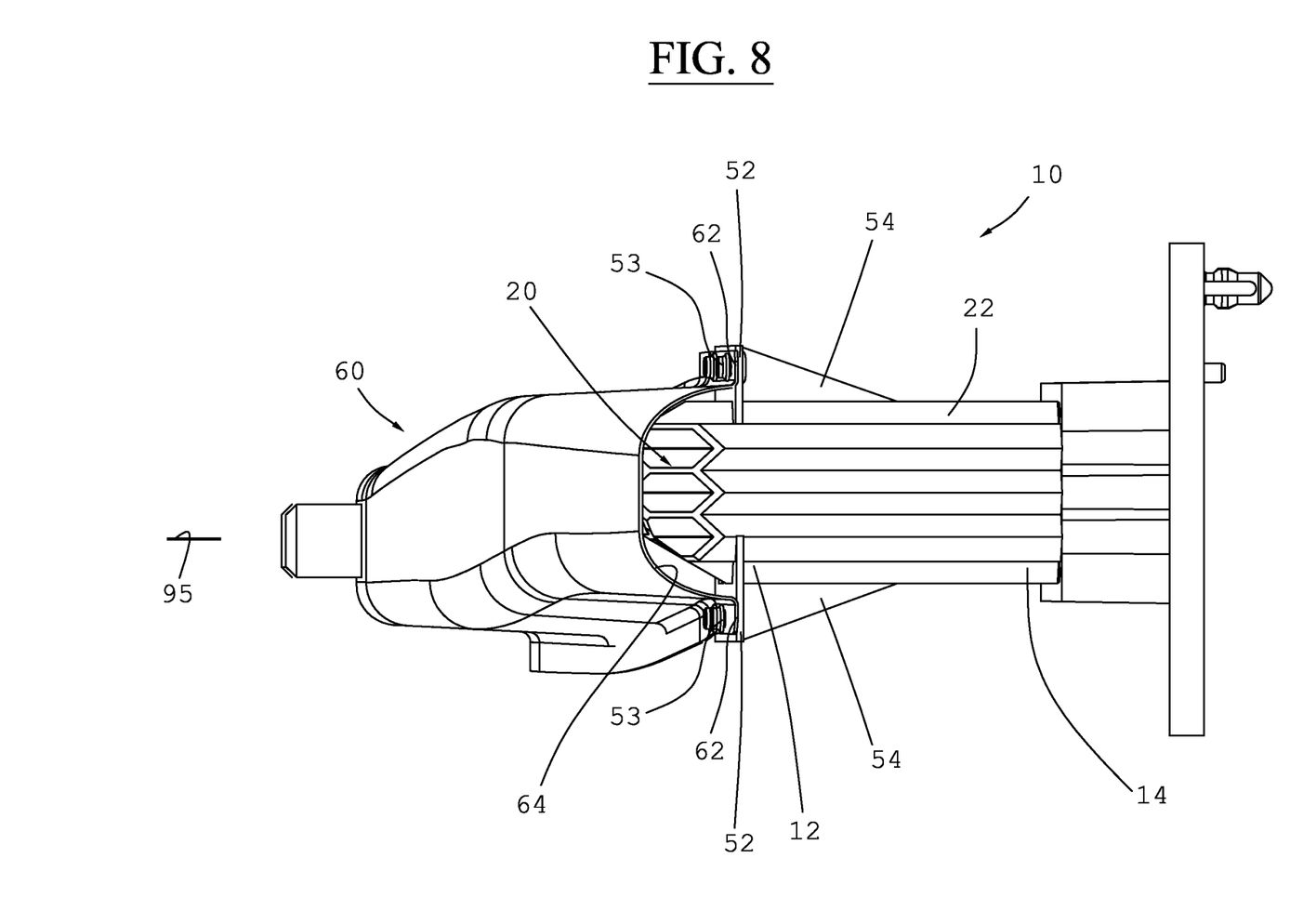
FIG. 8 is a raised lateral right partially sectioned view of the bumper structure of FIG. 5.
Figure 9:
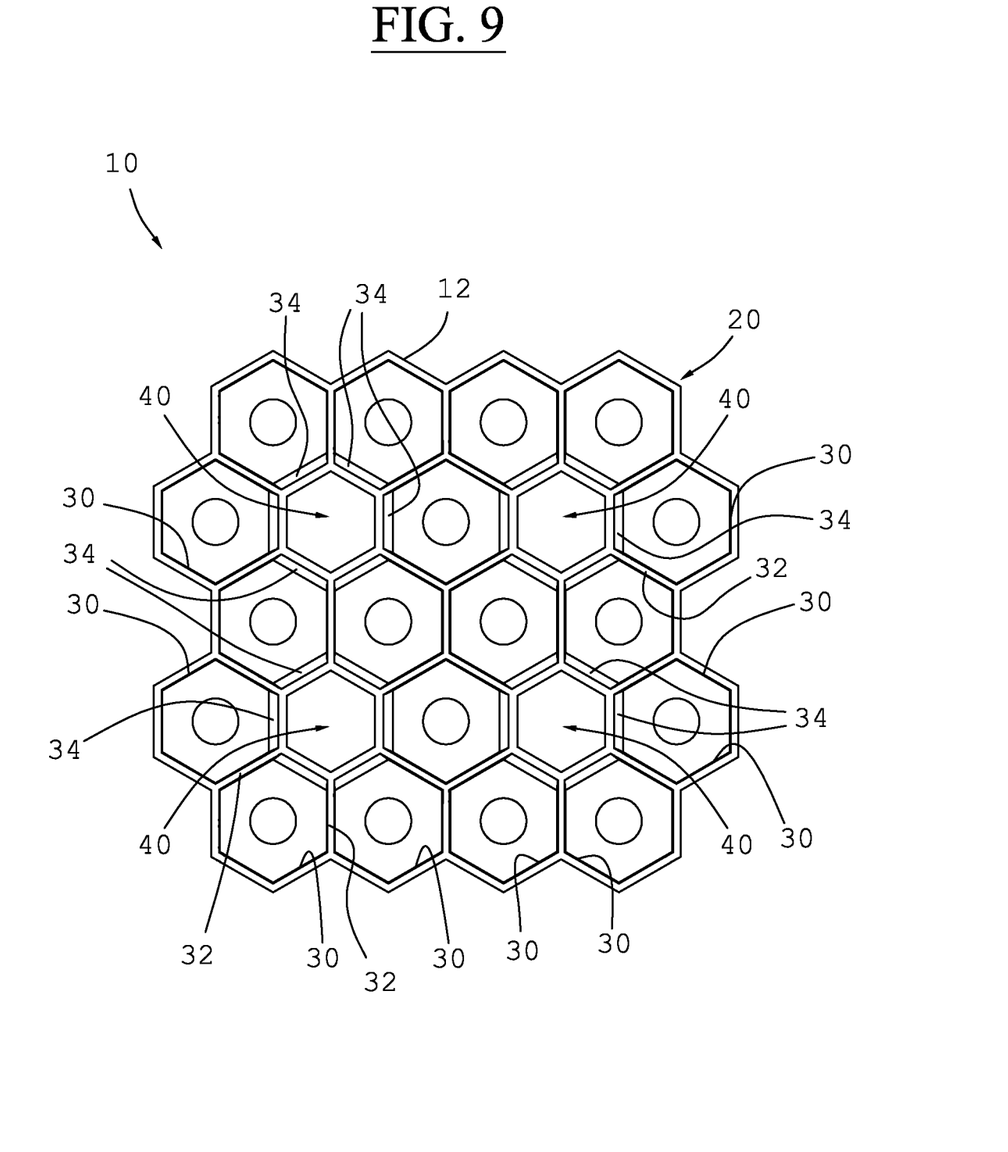
FIG. 9 is a front view of a preferred embodiment of the polymeric crash box according to the present invention.
Figure 10:
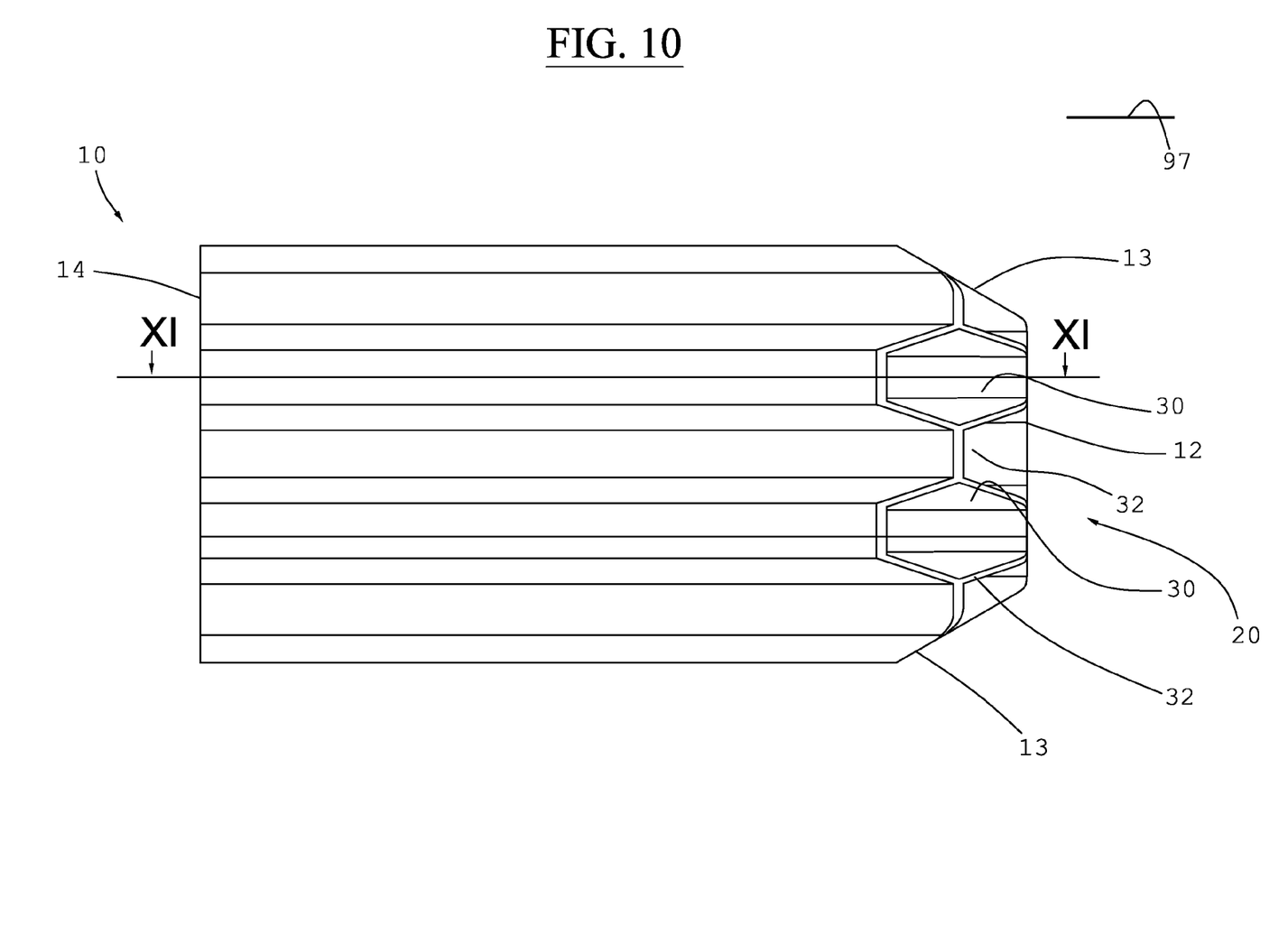
FIG. 10 is a raised lateral left view of the crash box of FIG. 9.
Figure 11:
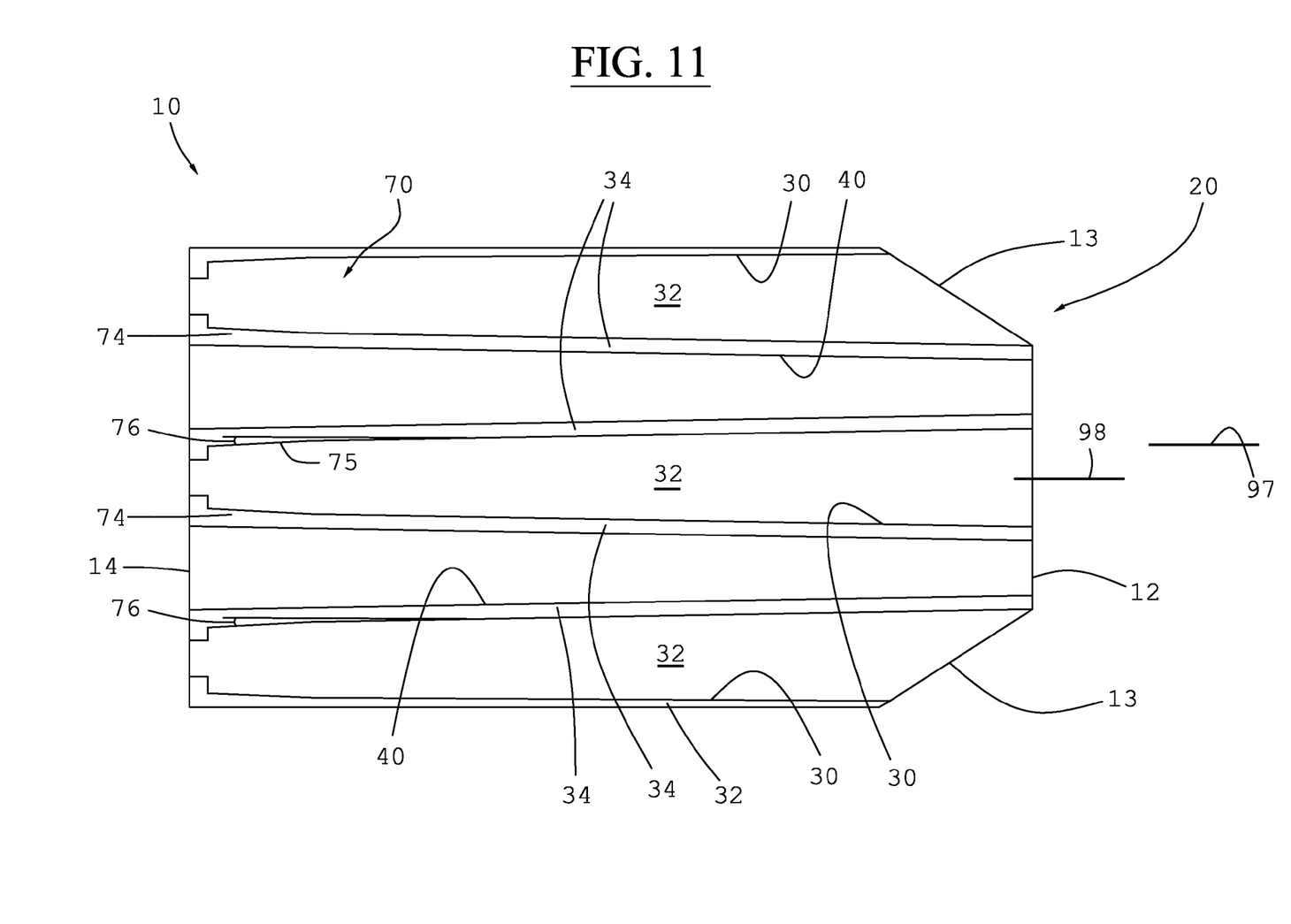
FIG. 11 is a raised lateral left view of a preferred embodiment of a section of the crash box of FIG. 10, sectioned along the line XI-XI.
Figure 12:
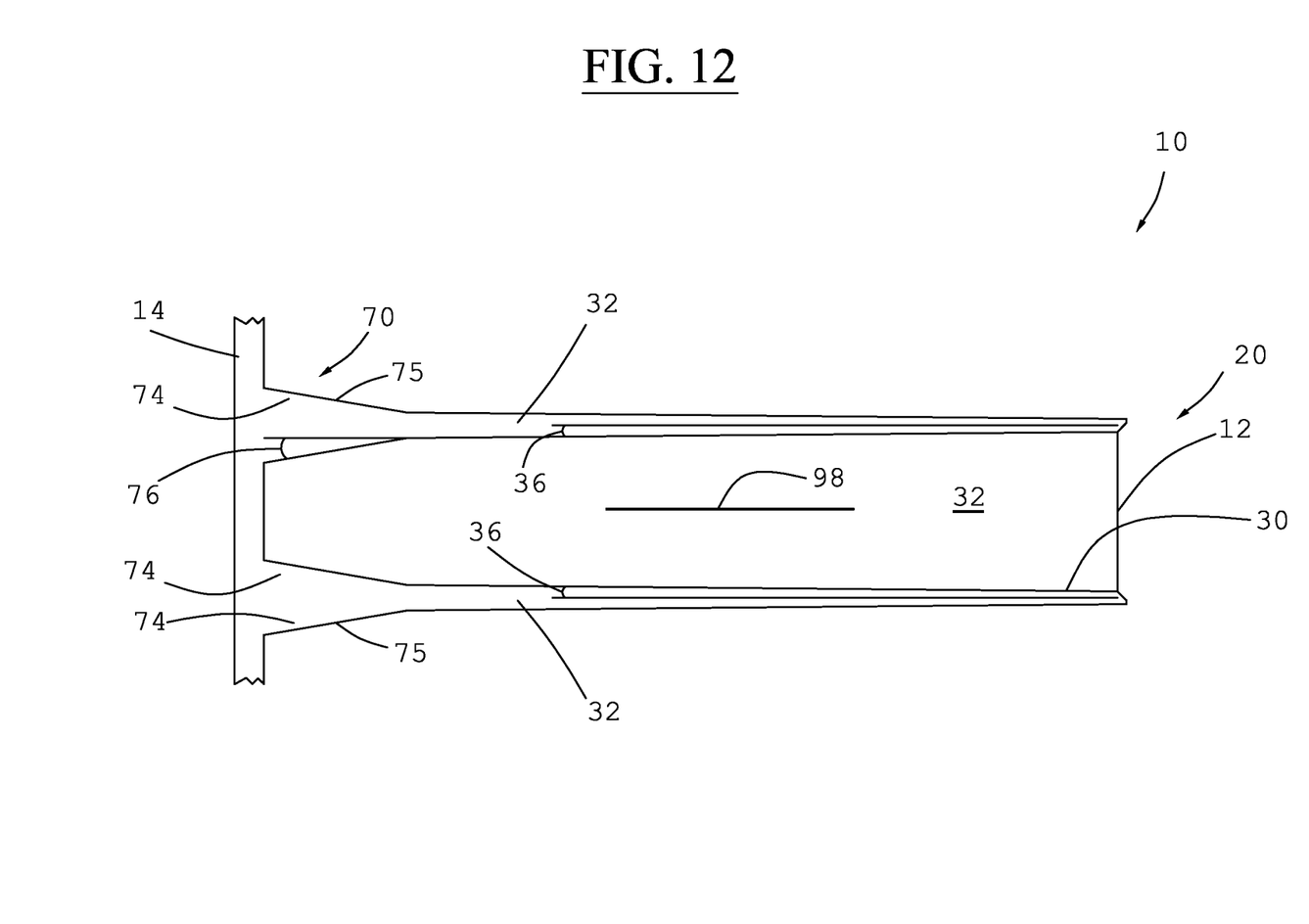
FIG. 12 is a schematic cutaway sectioned view along a longitudinal axis showing a detail of a polymeric crash box according to a preferred embodiment.
Figure 13:
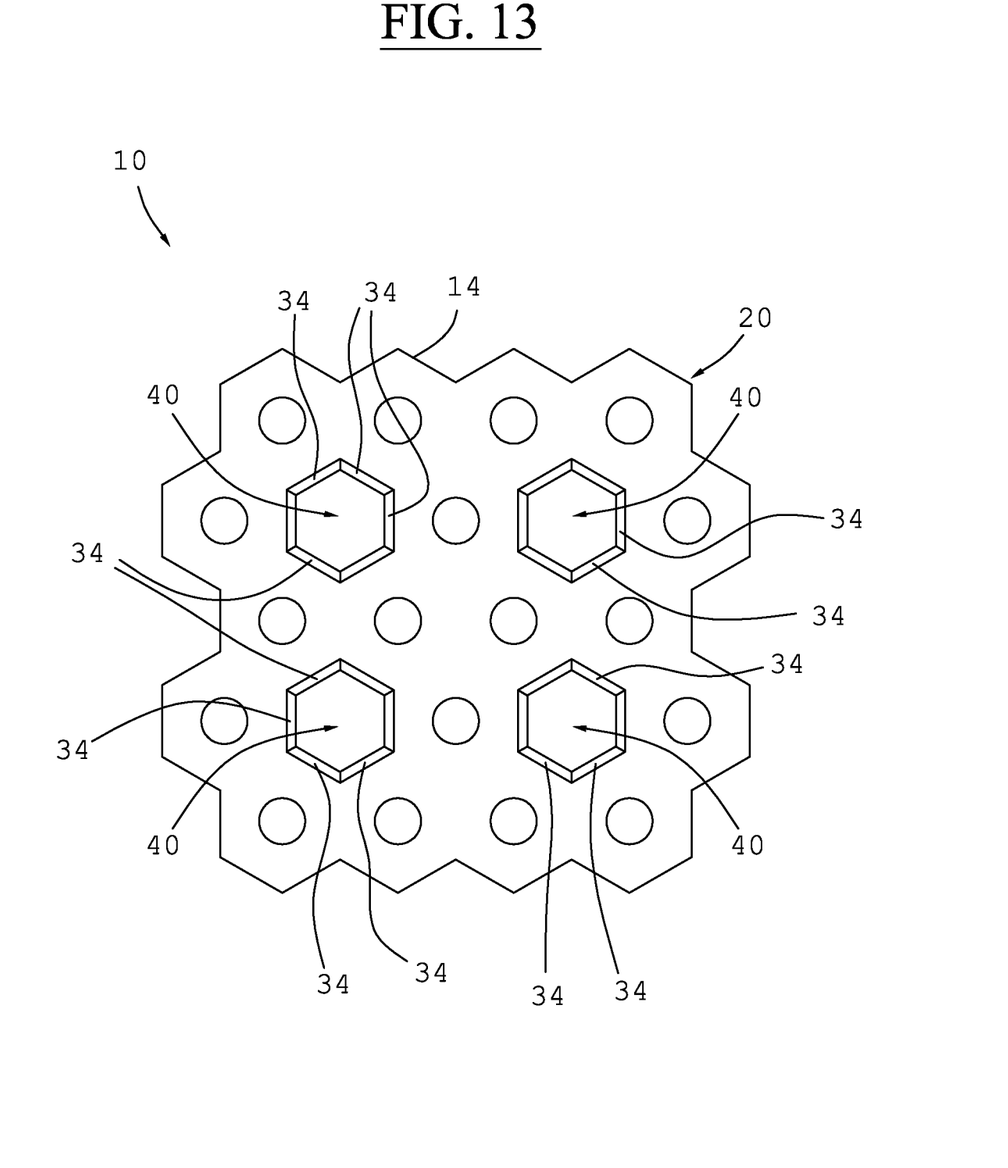
FIG. 13 is a raised front rear view of a detail of the polymeric crash box of FIG. 9 with polymeric fixing means to a crossbeam.
Figure 14:
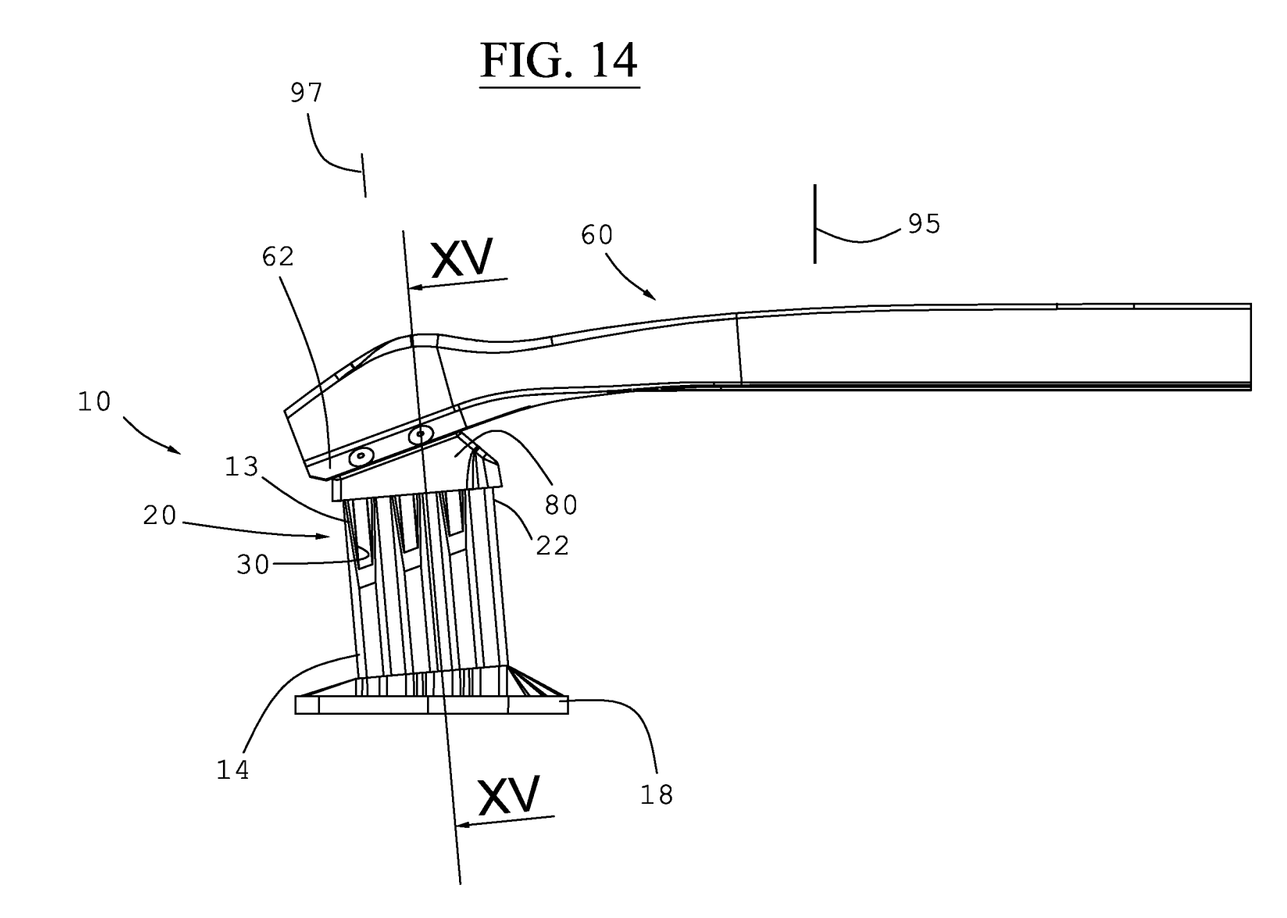
FIG. 14 is a schematic cutaway sectioned view along a longitudinal axis showing a detail of a polymeric crash box according to a preferred embodiment.
Figure 15:
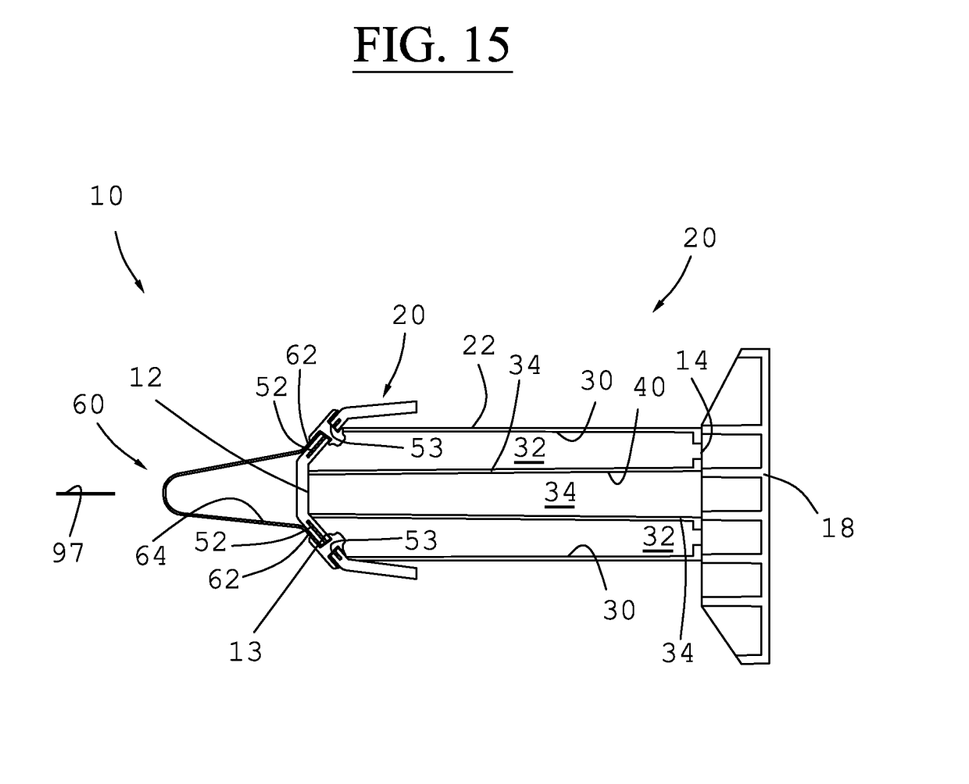
FIG. 15 is a raised lateral right view of a preferred embodiment of a section of the crash box of FIG. 14, sectioned along the line XV-XV.

Furthermore, with reference to the FIGS. 1 and 2, preferably each channel 40 of said second plurality of channels 40 is not placed on the outer lateral periphery of said substantially alveolar structure 20.

Preferably this permits to have great rakes in some channels 30 and 40 mutually adjacent, by permitting a great reduction of the extraction force of said polymeric crash box 10, and at the same time it permits to have a very stable polymeric crash box 10 and able to reduce at a minimum the increase of the resistant section, in direction of said second rear extremity 14, and so it guarantees the most possible constant collapsing force.

Preferably in order to obtain the most possible constant collapsing force during said impact at least a portion of said channels 30 is internally slightly tapered, going towards said second rear extremity 14, and also preferably it has a plurality of walls 32 each of them having a first smaller average rake 36 which, with respect to an axis 98 of a corresponding channel 30 is preferably comprised between 0.01° and 1° and in particular it is comprised between 0.01° and 0.5°.

Advantageously this permits to further stabilize during the impact said first open frontal extremity 12, without excessively increasing its resistance to said impact.

In this way it is possible to determine a plurality of programmed bending, starting from said first open frontal extremity 12 without limiting the capacity of absorption of said crash box 10.

According to a preferred embodiment, at least one portion of said plurality of channels 30 internally has a first smaller average rake 36 starting from the open frontal extremity 12, which has, with respect to an axis 98 of a corresponding channel 30, a value preferably comprised between 0.01° and 1° and still more preferably comprised between 0.01° and 0.5°, and a second greater average rake 76 which is only present at said second rear extremity 14 and furthermore which has with respect to said axis 98 a value preferably comprised between 0.01° and 4° and still more preferably between 0.5° and 2°.

In particular, said second greater average rake 76 is present only at said second rear extremity 14, and at an inner inclined profile 75 which is caused by stiffening means 70 comprising at least one stiffening portion 74 realised in a polymeric material and placed only at said second rear extremity 14, with which said crash box 10 is preferably provided, which is directly injection moulded in a single piece around the same.

Advantageously in this way is possible to realize a polymeric crash box 10 easy to realize and with a reduced production cost.

Preferably at least one part of said plurality of channels 30 is extremely tapered going towards said second rear extremity 14 and it has also externally an average rake which, with respect to an axis 98 of each corresponding channel 30 preferably has a value comprised between 0° and 4° and in particular comprised between 0° and 2°.

Preferably said first open frontal end 12 has a plurality of faces 13 which are inclined and non orthogonal with respect to a longitudinal direction 97 by advantageously permitting to reduce the initial collapsing force in the first instants of said impact.

Said plurality of faces 13 has the function to reduce the initial stress during an impact, in particular in case of an impact force angled with respect to said longitudinal direction 97.

In this way is also possible to always have a surface of a face 13 that is substantially orthogonal to said angled impact force, by consequently obtaining a better distribution of the stress on a greater number of channels 30 of said plurality of channels 30.

On the contrary, without said plurality of faces 13 with an angled impact force a distribution of the stresses is determined on a much smaller number of channels 30 by consequently determining a lower absorbing capacity of the impact, as the number of stressed channels 30 would be reduced.

Preferably said at least two substantially planar polymeric fixing elements 52 are integrated in a polymeric cap 80 which is realized in just one piece with said open frontal extremity 12 and in particular also at least partially with said plurality of faces 13 of said polymeric crash box 10.

In particular said polymeric cap 80 closes at least partially said first open frontal extremity 12 of said polymeric crash box 10, and besides preferably said at least two substantially planar polymeric fixing elements 52 are positioned symmetrically respect to a longitudinal symmetry axis of said polymeric crash box 10.

Advantageously in this way said polymeric cap 80 permit to guide the plastic deformation of the polymeric crash box 10 during a crash and permit a greater stability of the same.

Preferably said at least one substantially planar polymeric fixing element 52 comprises a metallic foil embedded internally to the same for having a greater rigidity without increase the thickness of the same.

Preferably said crash box 10 comprises fixing means in particular connectable with a frame of said motor vehicle, which are constrained or directly integrated in said second rear extremity 14.

Preferably said fixing means comprise a plurality of holes 19 which are obtained in said second rear extremity 14 and which advantageously permit a total weight reduction of said polymeric crash box 10.

Preferably said fixing means comprise a polymeric base 18 which has a surface connecting with said polymeric crash box 10, which is inclined with respect to a longitudinal direction 95 of said vehicle.

Advantageously in this way it is possible to easily incline said polymeric crash box 10 with respect to said longitudinal direction 95 in order to absorb impacts angled between 5° and 10° with respect to the same longitudinal direction 95, by maintaining a great absorbing capacity of the impact and avoiding the need of moulding said plurality of inclined channels as this operation is very difficult and also very expensive.

Preferably said crash box 10 also comprises a substantially longitudinal through hole, in order to permit the insertion of a hook which can be utilized in particular to drive a transportation means, which in particular is tapered preferably at said second rear extremity 14 of an angle preferably comprised between 0.01° and 4° and even more preferably between 0.01° and 2°.

This in order to avoid a failure or a plurality of bending starting from said second rear extremity 14.

Preferably said crash box 10 is realized in a single piece, in particular through injection moulding, with a high impact strength polymeric material, which according to an ISO type 180/1A test at 23° C. has a rupture energy of at least 5 KJ/m$^2$ and in particular of at least 10 KJ/m$^2$, which in particular is a polymeric material, preferably chosen among a polymeric mixture of polybutylene-terephtalate and polycarbonate, as for example a polymeric material known with the trademark Xenoy™, and a polymeric mixture of polifenylene-oxide and a poliammidic resin, as for example a polymeric mixture, known with the trademark Noryl™, and/or among polymeric materials having similar features.

Preferably said polymeric material is chosen among: a mixture of a polyfenilene-ether (PPE) and a polyamide (PPE), a mixture of a polyfenylene-ether (PPE) and a polybuthylene-terephtalate, a mixture of a polyfenylene-ether (PPE) and a polyethylene (PE), a mixture of a polyfenylene-ether (PPE) and a polypropylene (PP), a mixture of a polyfenylene-ether (PPE) and a polystyrene (PS), a mixture of a polycarbonate (PC) and a polybutylene-terephtalate (PBT), a mixture of a polycarbonate (PC) and a polyethylene-terephtalate (PET), a polypropylene rubber, a polyamide rubber, and/or their derivatives.

According to another aspect of the present invention, a lateral bumper structure for a vehicle is provided, comprising at least two polymeric crash boxes 10 of the previously described type, a crossbeam 60 in particular having a substantially Ω-shaped cross-section, and an external polymeric bumper covering, not shown in the Figures, just having an aesthetic function which covers said crossbeam 60 and said at least two polymeric crash boxes 10.

Preferably said crossbeam 60 comprise two substantially planar base portions 62, to which said at least one substantially planar fixing element 52 of said polymeric crash box 10 is fixed, so that said first open frontal extremity 12 is spaced, preferably along a longitudinal direction 97 substantially of about 5 mm, in particular about 15 mm, with respect to a bottom portion 64 of said crossbeam 60, furthermore said preferably metal crossbeam is plastically deformable with an effort smaller than the minimum effort necessary for the deformation of said polymeric crash box 10.

Preferably said two base portions 62 comprise a plurality of through holes 65 corresponding to a plurality of holes 53 of a corresponding polymeric crash box 10 for fixing to same to said crossbeam 60 so avoiding a direct connection with said frame.

Advantageously in this way during a frontal impact with a pedestrian it is possible to reduce at the minimum the damage to the same, as said preferably metal crossbeam 60 is plastically deformable with an effort smaller than the minimum effort necessary for the deformation of said polymeric crash box 10, so permitting a plastic deformation of the crossbeam 60 until the same after bending and deforming comes in contact with said first free open extremity 12 of at least one polymeric crash box 10.

Preferably said crossbeam 60 comprises a plurality of reinforcing elements 63 each of them having two extremities which are made integral with said two base portions 62, so stiffening said crossbeam 60 and advantageously maintaining a reduced weight and advantageously permitting an easy assembling of said at least two polymeric crash boxes 10 to said crossbeam 60.

Preferably said crossbeam 60 is made of a metal material like steel or aluminium, or it is made of a polymeric matrix composite material reinforced with carbon fibres and/or glass fibres.

Advantageously this permits to globally have a reduced weight of said bumper structure and a good rigidity of said crossbeam 60.

Preferably said bottom portion 64 of said crossbeam 60 comprises a plurality of bosses, non shown, which are placed at said first open portion 12 of said at least one polymeric crash box, in order to increase the friction with the same during said impact.

Advantageously this determines a greater stability of said at least one polymeric crash box 10 and so also of said bumper structure.

According to another aspect of the present invention, a motor vehicle is provided comprising a bumper structure in particular a frontal one, of the previously described type.

So it was seen that a polymeric crash box for a vehicle and a bumper structure according to the present invention attain the purposes previously highlighted.

The polymeric crash box for a vehicle and the bumper structure of the present invention so conceived is susceptible of various changes and variations, all within the same inventive concept.

Furthermore, in practice, the used materials, as well as their dimensions and components, can be of any kind according to the technical needs.

The invention claimed is:

1. A polymeric crash box (10) for a motor vehicle, said polymeric crash box (10) having a first open frontal extremity (12) and a second rear extremity (14), said polymeric crash box (10) further comprising a substantially alveolar structure (20) having a plurality of channels (30) formed in just one piece, said plurality of channels (30) extending internally to said crash box (10) starting from said first open frontal extremity (12) towards said second rear extremity (14), each channel (30) of said plurality of channels (30) further being internally tapered towards said second rear extremity (14), at least one substantially planar polymeric fixing element (52) which is made integral to the same polymeric said crash box (10) in proximity of said first frontal open extremity (12) and which is further fixable to a crossbeam (60), wherein said substantially alveolar structure (20) comprises a second plurality of channels (40) formed in a single piece with said plurality of channels (30), said second plurality of channels (40) extending starting from said second rear extremity (14) towards said first frontal open end (12), each channel (40) of said second plurality of channels (40) being internally tapered towards said first frontal open extremity (12).

2. The polymeric crash box (10) according to claim 1, characterized in that said at least one substantially planar polymeric fixing element (52) comprises a plurality of polymeric stiffening means (54) each of which is substantially a substantially planar polymeric element with a substantially triangular shape which is made integral with an external lateral surface (22) and with said at least one substantially planar polymeric fixing element (52) in order to be substantially parallel to a longitudinal direction.

3. The polymeric crash box (10) according to claim 1, characterized in that said at least one substantially planar polymeric fixing element (52) comprises a base surface and a plurality of through holes (53), which are formed on the base surface, and in that said polymeric crash box (10) is fixed to said crossbeam (60).

4. The polymeric crash box (10) according to claim 1, characterized in that said at least one substantially planar polymeric fixing element (52) are at least two substantially planar polymeric fixing elements (52) which are fixed at said first open frontal extremity (12) on opposed sites of an external lateral surface (22) of said alveolar structure (20).

5. The polymeric crash box (10) according to claim 1, characterized in that each channel (40) of said second plurality of channels (40) is surrounded only by channels (30) of said plurality of channels (30) internally tapered towards said second rear extremity (14).

6. The polymeric crash box (10) according to claim 1, characterized in that each channel (40) of said second plurality of channels (40) is surrounded by at least 3 channels (30) of said plurality of channels (30) internally tapered towards said second rear extremity.

7. The polymeric crash box (10) according to claim 1, characterized in that said plurality of channels (30) comprises a plurality of walls (32) each of which is a wall of another channel (30) of said plurality of channels (30) internally tapered towards said second rear extremity (14), and said plurality of channels (30) further comprises a plurality of second walls (34) each of which is a wall of a corresponding channel (40) of said second plurality of channels (40), and in that each channel (40) internally tapered towards said first open frontal extremity (12) comprises only said plurality of second walls (34).

8. The polymeric crash box (10) according to claim 7, characterized in that each second wall (34) advantageously has a thickness substantially constant along a longitudinal axis (95), whereas each wall (32) of said plurality of walls (32) has an increasing thickness towards said second rear extremity (14).

9. The polymeric crash box (10) according to claim 7, characterized in that each second wall (34) is substantially inclined with respect to a longitudinal axis (98) of a corresponding one of said second plurality of channels (40) with an angle the absolute value of which is comprised between 0° and 5°.

10. The polymeric crash box (10) according to claim 7, characterized in that in that each wall (32) with respect to a longitudinal axis (95) of a correspondent channel (30) has a rake the absolute value of which is comprised 0° and 0.2°.

11. The polymeric crash box (10) according to claim 1, further comprising fixing means connectable with a frame of said motor vehicle, which are bound or directly integrated with said second rear extremity (14), said fixing means comprising a plurality of holes (19) in said second rear extremity (14) and which provide a reduction of the total weight of said polymeric crash box (10).

12. The polymeric crash box (10) according to claim 1, characterized in that said crash box (10) is formed in just one piece of a polymeric material with high impact strength, which with a test of the type ISO 180/1A at 23° C. shows a breaking energy of at least 5 KJ/m$^2$, which is a polymeric material chosen between a mixture of a polyphenylene ether (PPE) and a polyammide (PA), a blend of a polyphenylene ether (PPE) and a polybutylene terephthalate (PBT), a blend of a polyphenylene ether (PPE) and a polyethylene (PE), a blend of a polyphenylene ether (PPE) and a polypropylene (PP), a blend of a polyphenylene ether (PPE) and a polystyrene (PS), a blend of a polycarbonate (PC) and a polybutylene terephthalate (PBT), a blend of a polycarbonate (PC) and a polyethylene terephthalate (PET), a polypropylene rubber, a polyamide rubber, and/or their derivates.

13. A bumper structure for a vehicle comprising at least two polymeric crash boxes (10) according to claim 1, in which a crossbeam (60) has a substantially Ω-shaped section and a polymeric external bumper housing having an aesthetic function, said polymeric external bumper housing covering said crossbeam (60) and said at least two polymeric crash boxes (10).

14. The bumper structure according to claim 13, further comprising two substantially planar base portions (62) to which said at least one fixing element (52) of said polymeric crash box (10) is fixed, so that said first frontal open extremity (12) is spaced with respect to a bottom portion (64) of said crossbeam (60), wherein an effort to plastically deform said crossbeam (60) is less than a minimum effort necessary for deformation of said polymeric crash box (10).

15. The bumper structure according to claim 14, characterized in that said crossbeam (60) comprises a plurality of stiffening elements (63) each of which has two extremities which are made integral with said two base portions (62) in order to stiffen said crossbeam (60) by maintaining a reduced weight and permitting an assembling of said at least two polymeric crash boxes (10) with said crossbeam (60).

16. A polymeric crash box (10) for a motor vehicle, said polymeric crash box (10) having a first open frontal extremity (12) and a second rear extremity (14), said polymeric crash box (10) further comprising a substantially alveolar structure (20) having a plurality of channels (30) formed in just one piece, said plurality of channels (30) extending internally to said crash box (10) starting from said first open frontal extremity (12) towards said second rear extremity (14), each channel (30) of said plurality of channels (30) further being internally tapered towards said second rear extremity (14), at least one substantially planar polymeric fixing element (52) which is made integral to the same polymeric said crash box (10) in proximity of said first frontal open extremity (12) and which is further fixable to a crossbeam (60), wherein said at least one substantially planar polymeric fixing element (52) comprises a plurality of polymeric stiffening means (54) each of which is substantially a substantially planar polymeric element with a substantially triangular shape which is made integral with said external lateral surface (22) and with said at least one substantially planar polymeric fixing element (52) in order to be substantially parallel to said longitudinal direction.

* * * * *